UNITED STATES PATENT OFFICE.

CARL STRAUB, OF OTISCO VALLEY, NEW YORK.

PROCESS OF TREATING CALCIUM OXID.

SPECIFICATION forming part of Letters Patent No. 636,865, dated November 14, 1899.

Application filed December 27, 1898. Serial No. 700,325. (No specimens.)

*To all whom it may concern:*

Be it known that I, CARL STRAUB, of Otisco Valley, in the county of Onondaga, in the State of New York, have invented new and useful Improvements in Processes of Treating Calcium Oxid, of which the following is a full, clear, and exact description.

The object of my invention is to produce a plaster or cement which will not shrink or crack and which will when exposed to the air in due time attain great hardness, solidity, and resisting power.

According to my process calcium oxid (calcined carbonate of lime calcined by the common process) is first subjected to a bath of water, the duration of the bath depending somewhat upon the size of the pieces or lumps of limestone—say, for instance, a half-hour, more or less. In subjecting the calcium oxid to the bath the quantity of water to be used is preferably sufficient to soften the lumps, so that when heat is applied a thorough breaking up of said lumps will be effected. In other words, my first step in the process consists in partially hydrating the calcium oxid. The second step in my process consists in checking the hydration and subjecting the partially-hydrated calcium oxid to the action of a slowly or rapidly produced heat, according to the result desired. The duration of the exposure of the treated calcium oxid to the heat, which may be either direct or indirect, depends to some extent upon the size of the lumps, generally lasting from one to five minutes, more or less. In any case it must be subjected to the heat until all moisture is expelled. The action of the heat upon the partially-hydrated calcium oxid produces a rapid breaking up of the lumps into smaller particles, which become hardened and contracted from contact with the heat and are subsequently ground to a powder, like plaster-of-paris or analogous substances.

I desire to have it understood that steam or vapor may be used for the bath in lieu of water. I do not desire to be limited, however, to the above-described process, as other processes, though inferior, perhaps, may be employed.

The salient feature of my invention is the breaking up or reducing to powder of the calcium oxid by subjecting it to moisture and then arresting further hydration without allowing it to absorb an undue quantity of water, which takes place in all the old processes of treating lime and which weakens its adhesiveness and power of cohesion and causes shrinkage and cracking after it has been formed into plaster or cement and has become dry. The calcium oxid may be prepared by removing it from the kiln while hot and then rapidly chilling the same by exposure to a cold blast or a momentary bath in cold water. This procedure causes an almost instantaneous crumbling of the limestone pieces. Other processes may be employed—such, for instance, as taking the limestone in a cold state and dipping it into hot water, preferably boiling, for a moment or two and then expelling all moisture. By dipping the limestone into hot or boiling water I obtain a more rapid breaking up of the structure than by the use of cold water. Still another way of carrying out my process is to treat the limestone by putting it into a basin containing water and different salts or acids in solution, as calcium sulfate, potash, or sodium in their different combinations with acids, boracic acid, &c., glue-and-gum solution, or any suitable admixture which will tend to delay the slaking of lime while still allowing mechanical or physical action, so as to allow the stone to absorb sufficient moisture to the core, and then heating the so-treated mineral till the proper breaking up of the same or almost entire pulverization takes place.

All of the above varied processes serve to break up the stone and contract or shrink the molecules or granules thereof, and when properly reduced to powder it will absorb no more water than able to crystallize. It will be obvious that more than the necessary quantity of water may be forced into the forming hydrate, as is the case with all other cements requiring water for their make-up.

In order to prevent all slaking after the calcium oxid has absorbed the required or proper amount of moisture, said slaking may be checked by subjecting the calcium oxid to a change of temperature—as, for instance, when it has been subjected to a bath of cold water for the proper length of time it may then be subjected to a heat, or if the calcium oxid has first been subjected to a hot bath it may afterward be subjected to a low temperature, thus suddenly changing the temperature and preventing further hydration of the calcium oxid. This partial hydration may be checked by chemical means and not by a change in temperature—as, for instance, by adding certain acids or salts to the water forming the bath.

The lime-cement produced according to my process will set like plaster-of-paris, will not shrink when cast, and will form a very consistent and durable mortar, superior in every way to the one manufactured by the old process.

My product is as inexpensive as the common lime-mortar and is not only able to bind a greater amount of sand, &c., but it is so prepared in the beginning to save the slaking, usually very imperfectly performed, which consequently saves much time and labor. The product can be made up gradually, thus saving room and preventing spilling and waste. In applying it shows great superiority over most cements by being consistent, pliable, light, and at the same time sufficiently tenacious to prevent dropping when applied to lathed walls. This lime-cement is easily pulverized and does not for at least a considerable time deteriorate. It keeps cool when brought in contact with water and is therefore in many respects like plaster-of-paris, which it will no doubt supersede in the building trade. As a common building material for cementing bricks and stones together it vastly surpasses the common mortar in handling, as well as in consistency and ability to attain within a few hours so much density and hardness as to safely stand in a green state when exposed to heavy rains—for instance, any dissolving action of water—and crystallize in a short time. It may be used in winter without incurring danger to consistency by frosty weather. Sifted finely and mixed with coloring-matter it can be used for a wall-paint, which serves as well outside as inside of buildings, since it will within a few minutes of application get carbonated in the open air and is indissoluble in water. As a finish-coat material it can be used without adding foreign substances to it. It does not shrink, as commonly-treated lime unavoidably does, but forms a smooth white surface on any coat on lath or stone.

This calcium cement can be strengthened or otherwise improved by addition of chemical substances especially destined to form chemically-stable combinations with the oxid of calcium, as well as substances which physically tend to create greater affinity of primary particles.

It will be obvious that in order to make plaster, cement, or other analogous material, or paint, or a fluid substance it will only be necessary to add or combine therewith water, or water together with sand, or coloring-matter, or any other suitable ingredients that may be desirable, depending upon the material or substance required. The addition or combination of the water or water with other substances to or with the treated calcium oxid may be effected by any suitable and well-known mechanical process.

The calcium oxid used may be in a pure or impure state.

I claim—

1. The herein-described process of treating calcium oxid, which consists, first, in softening the same by partial hydration, and second in reducing the mass to an indurated granular form by heating.

2. The herein-described process of treating calcium oxid, consisting of partially hydrating the same, and then recalcining it until all moisture is expelled.

3. The herein-described process of treating calcium oxid, consisting of partially hydrating the same; then checking hydration, by finally recalcining it until all moisture is expelled.

4. The herein-described process of treating calcium oxid, consisting of partially hydrating the same, and then expelling all moisture thereby reducing it to a crystallized granular form.

5. The herein-described process of treating calcium oxid, consisting of partially hydrating the same; then removing the partially-hydrated calcium oxid from the water; then subjecting it to the action of heat to expel the moisture and reduce it to a crystallized granular form, and finally pulverizing it.

6. The herein-described process of treating calcium oxid, consisting of partially hydrating the same in cool water; then removing it from the water, and then suddenly subjecting it to the action of heat until all moisture is expelled.

7. The herein-described process of treating calcium oxid, consisting of partially hydrating the same, in water combined with a substance which will prevent undue slaking; then removing the partially-hydrated calcium oxid, and finally subjecting the treated calcium oxid to the required degree of heat to remove all moisture.

8. As a new article of manufacture, lime which has been partially hydrated, then recalcined to a crystallized granular form, by having all moisture expelled therefrom, and then reduced to powdered form.

In testimony whereof I have hereunto signed my name.

CARL STRAUB. [L. S.]

Witnesses:
M. J. CHRYST,
H. M. SEAMANS.